United States Patent [19]

Batschari et al.

[11] Patent Number: 5,566,457
[45] Date of Patent: Oct. 22, 1996

[54] JOINT CUTTER

[76] Inventors: Constantin Batschari, 61118 Bad Vilbel; Herbert Mittländer, Affentorplatz 5, 60594 Frankfurt am Main, both of Germany

[21] Appl. No.: 295,878
[22] PCT Filed: Mar. 2, 1993
[86] PCT No.: PCT/EP93/00466
  § 371 Date: Sep. 6, 1994
  § 102(e) Date: Sep. 6, 1994
[87] PCT Pub. No.: WO93/17849
  PCT Pub. Date: Sep. 16, 1993

[30] Foreign Application Priority Data

Mar. 3, 1992 [DE] Germany ............................ 9202769 U

[51] Int. Cl.⁶ .................................................. B23D 45/16
[52] U.S. Cl. ................................ 30/390; 30/233; 83/478; 451/358; 451/456
[58] Field of Search ............................. 30/390, 233, 263, 30/264, 265, 286, 287; 83/478; 125/13.01; 451/456, 451, 358

[56] References Cited

U.S. PATENT DOCUMENTS

| 4,188,934 | 2/1980 | Reinhart et al. | 125/13.01 |
| 4,236,356 | 12/1980 | Ward | 125/13.01 |
| 4,243,011 | 1/1981 | Bodycomb et al. | 451/456 |
| 5,074,044 | 12/1991 | Duncan et al. | 30/390 |

FOREIGN PATENT DOCUMENTS

| 669110 | 3/1966 | Belgium . |
| 0314954 | 5/1989 | European Pat. Off. . |
| 1725063 | of 1956 | Germany . |
| 1052099 | 3/1959 | Germany . |
| 3811197 | 6/1990 | Germany . |
| 3919701 | 12/1990 | Germany . |

*Primary Examiner*—Timothy V. Eley
*Attorney, Agent, or Firm*—Dennison, Meserole, Pollack & Scheiner

[57] ABSTRACT

The invention relates to a joint outter comprising a tool set fitted with a drive in a housing and a casing surrounding the tool set comprising two mutually attachable sections, with a slot via which a segment of the tool set can project. In order to be able easily to cut slots even in the transition region between mutually inclined surfaces, it is proposed that a rear section of the casing be connected to the drive housing and a front section removable from the rear one cover a further segment of the tool set.

6 Claims, 4 Drawing Sheets

JOINT CUTTER

The present invention relates to a joint cutter comprising a tool set operated by a drive that is provided with a housing, and a covering that partially surrounds the tool set and comprises two mutually attachable sections like a casing, with a slot through which a segment of the tool set can project.

Using such a joint cutter, which can be used, for example, for performing the slotting operations that are required in the course of electrical installation work, elongated slots can be cut in walls without any problems; when this is done, the slots can be cut in any direction, which is to say, downward from above, or upward from below. Because the disks can be adjusted relative to each other, slots of any width can be produced. In addition, appropriate joint cutters incorporate means for collecting any dust that is generated by vacuuming it up.

Safety regulations require that the tool set be largely covered, so that only one segment, with which work is being performed, remains exposed. If one wishes to cut slots in projections such as lintels or the like, joint cutters of this kind cannot be used in the horizontal area. Rather, a slot for a cable, pipe, or the like has to be made by chiselling out the appropriate surface. This is a disadvantage it work is being done professionally, for such chiselling operations take up a great deal of time, and they cannot be performed with the high degree of precision that is possible with a power tool.

DE 38 11 197 A1 describes an adapter for a machine tool that is guided by hand; in this, a grinding or milling disk is partially covered by a housing that exposes a segment that can be adjusted for height.

DE 39 19 649 A1, describes an angle-grinder safety cover that is in one part and surrounds a grinding disk by sections.

EP 0 314 954 describes a two-part cover for a hand tool, which is divided into two parts parallel to a diamond disk, that is used to cut grooves.

In a two-part protective housing for a joint cutter, a front section can be pivoted to a rear section of the housing, and the first section is connected to a load-bearing cable that runs, for example, from a nail that is driven into a wall (DE-B 052 099). Such a protective housing is awkward to use and suffers from the disadvantage that the front section pivots back in an uncontrolled manner. Because of the fact that the front section pivots into the area of the rear section, there is no possibility of attaching a suction connector to this, since the opening of such a connector could be covered over by the front section.

Thus, it is the task of the present invention to so develop a joint cutter of the type described heretofore that slots can be cut without any problem in the transition area between surfaces that are disposed at an angle to each other, so that, as it were, the cut be made "around a corner," without any need for auxiliary devices in addition to the joint cutter.

According to the present invention, this problem has been solved in that a mounting extends from the drive housing, this being connected to a rear section of the covering such that the height of the segment of the tool set that projects from the slot is adjustable; in that a front section of the covering, which can be removed from the rear section that incorporates a vacuum connector, covers an additional segment of the circular tool set, the segments of the tool are defined by chords which intersect perpendicularly or essentially perpendicularly when the front section of the covering is removed.

Consequently, according to the present invention, it is possible to cut slots in corner areas or in the transition area between two surfaces that form a right-angle, and to do so without any difficulty, since all that is required is to remove the front section of the covering so that an additional segment of the tool set is exposed in order to the perform the work, this segment being preferably perpendicular to segment that is otherwise exposed.

In order to permit simple but secure assembly of the sections of the housing, the edges of one section, preferably the rear section, form receptacles for the edges of the other section or for projections that extend from such edges of the other section.

The projections can be formed as hooks that enter into detent into the receptacles, the receptacles themselves being formed preferably as receiving slots.

Other types of releasable connections are also possible.

In order to ensure an uncontrolled slipping of the mounting and the covering, it is preferred that the mounting comprises two plate-like sections that are at an angle to each other and extend along the covering from surfaces of the rear section.

A further development of the present invention provides that the rear section incorporate a handle that can simultaneously act as the vacuum connector.

In order to permit the joint cutter to slide effortlessly along the wall in which the slot is to be cut, provision is made such that each section incorporates at least one slider element that rotates about a shaft that is parallel to the plane that is covered by the slot in the covering.

Other details, advantages, and features of the present invention are not only set out in the claims and from the features described in these, but also in the following description of an embodiment that is shown in the drawings appended hereto. These drawings show the following:

Figure 1:
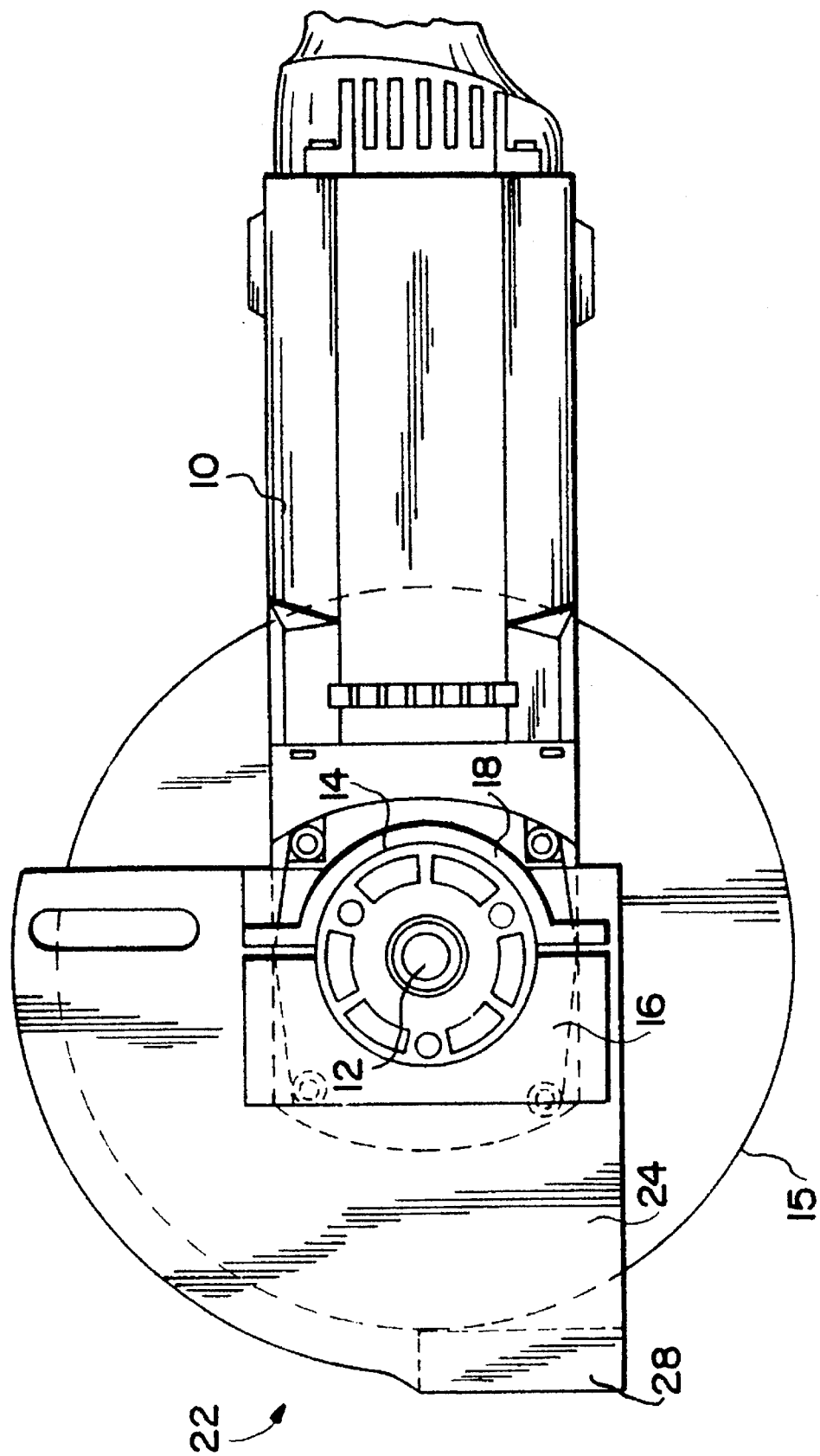
FIGS. 1 and 2 show essential components of a joint cutter.
Figure 2:
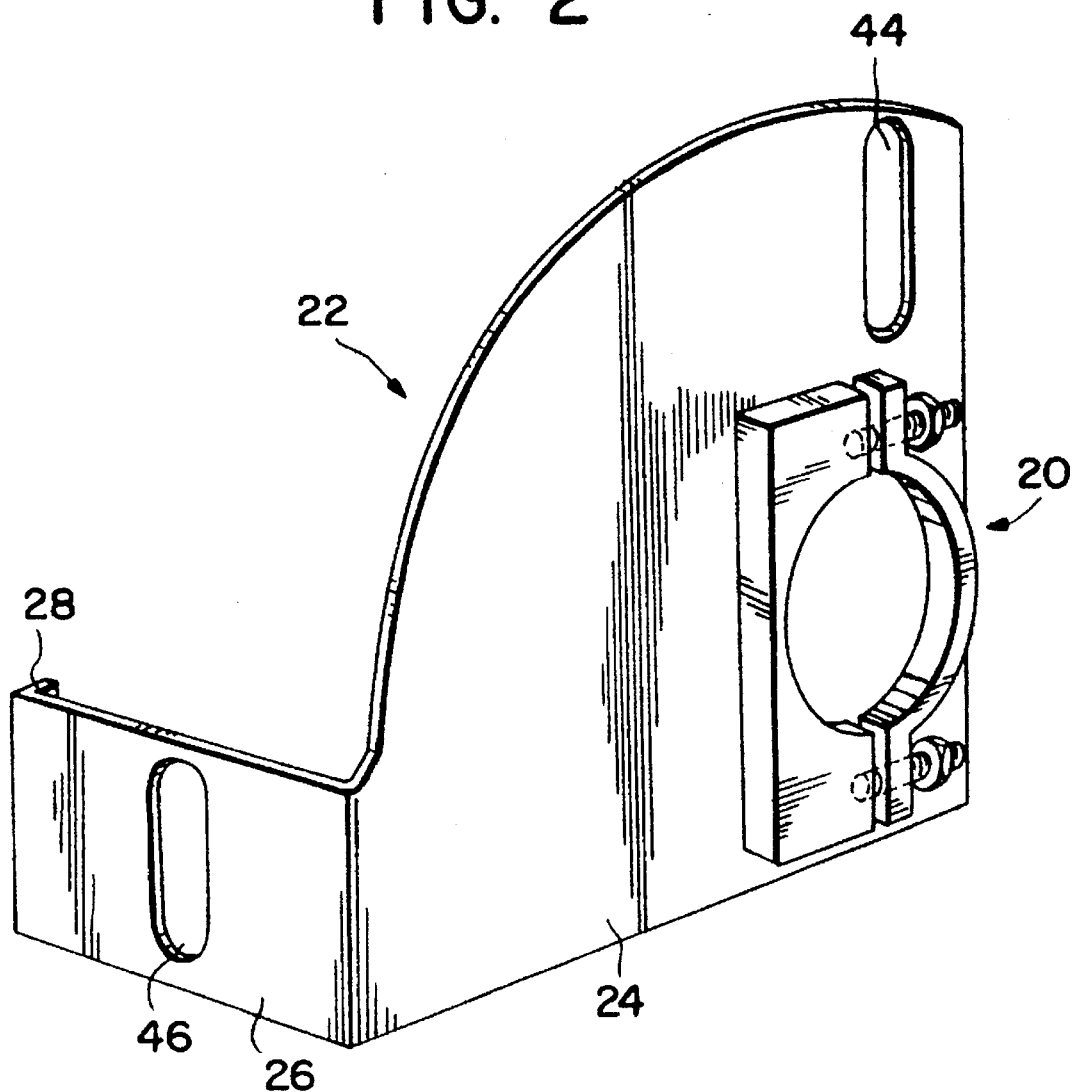
Figure 3:
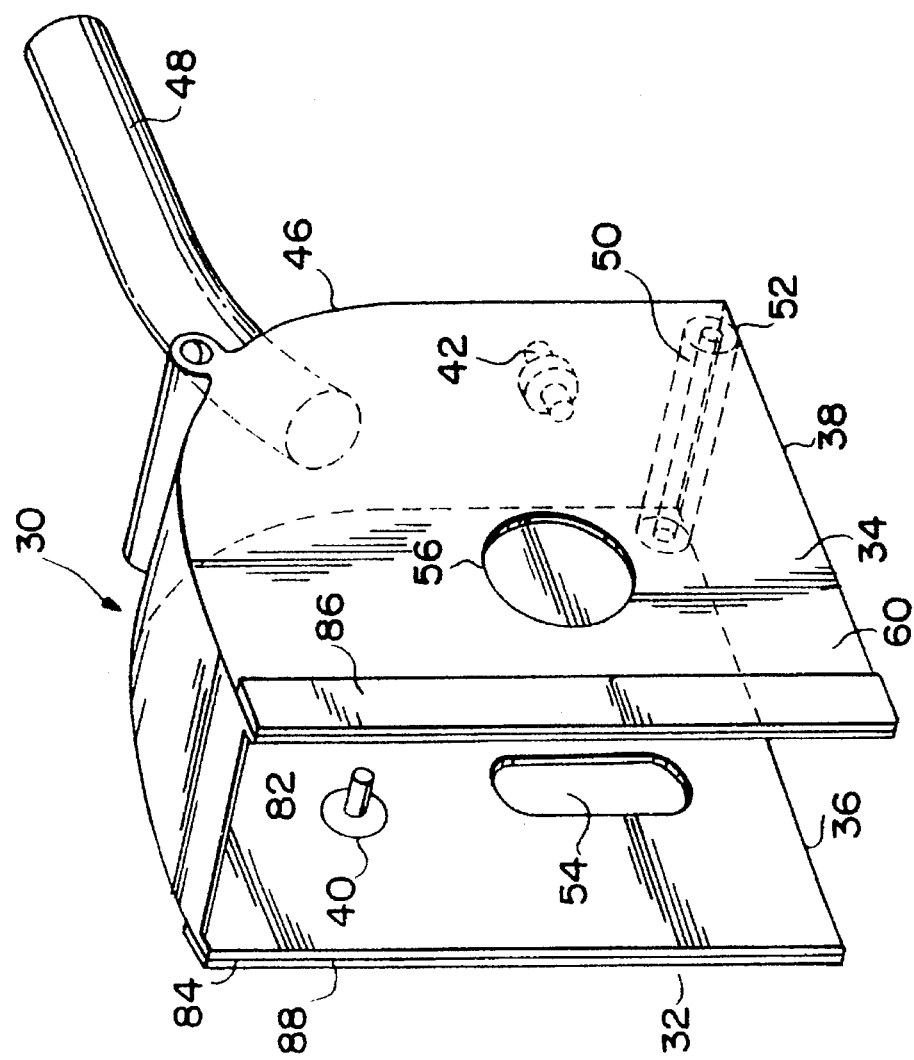
FIGS. 3 and 4 show the two part covering of the instant invention.

The drawings show the essential parts of a known joint cutter that is sufficiently familiar from the structural design.

The joint cutter comprises a drive in the form of an electric motor that is arranged in a housing (10). A shaft (12) extends from the housing (10), and a circular tool set, such as diamond disks (15), can be secured to this.

The shaft (12) is enclosed by a disk shaped fitting (14) that is accommodated by a clamp ring (20) that consists of the two parts (16) and (18), and disk-shaped fitting is clamped in this ring.

The clamp ring (20) extends from a mounting (22) that consists of two plate-like sections (24) and (26) that are at right-angles to each other. An angled edge (28) extends from the smaller section (26) that is of rectangular shape.

The sections (24) and (26) with the angled edge (28) thus form an uneven U shape; however, the section of the surfaces of the edge (28) and of the section (24) that face each other is matched to the outside dimension of a rear section (30) of a covering that is releasibly connected to the mounting (22) and which encloses the tool that extends from the shaft.

The section (30) consists of a side wall (32)—the rear wall in the drawing— and a second—front—side wall (34) that is parallel to wall (32). The section (24) thus extends along the outside surface of the wall (32), the outlines being matched to each other.

A segment of the disks passes through the plane that lies between the lower edges (36) and (38), the height of the segment being adjustable. To this end, the section (30) can be adjusted relative to the mounting (22). This is made possible in that attachment elements (40) and (42) pass through elongated holes (44) and (46) in the mounting (22).

The elongated holes (44) and (46) extend perpendicularly to the plane that is bounded by the edges (36) and (38) of the walls (32) and (34), so that as a result of this the height of the exposed segment of the tool set is adjustable, which once again determines the depth of the slot.

A handle (40) extends from a rear wall (46) that joins the parallel side walls (32) and (34), and this also serves as a vacuum connector.

Finally, a slide element, which can be designated a guide roller (50), extends in the area of the edges (36) and (38), and this can rotate about a shaft (52) that is parallel to the axis of the tool set. During the slot-cutting operation, the guide roller (50) is set on the surface in which a slot is to be cut.

The shaft (12) of the drive passes through the elongated hole (54) in the wall (32).

There is a circular opening (56) in the opposite wall (34), and the shaft (12) is accessible through this, so that, if needs be, the distance between the disks can be adjusted.

Figure 4:
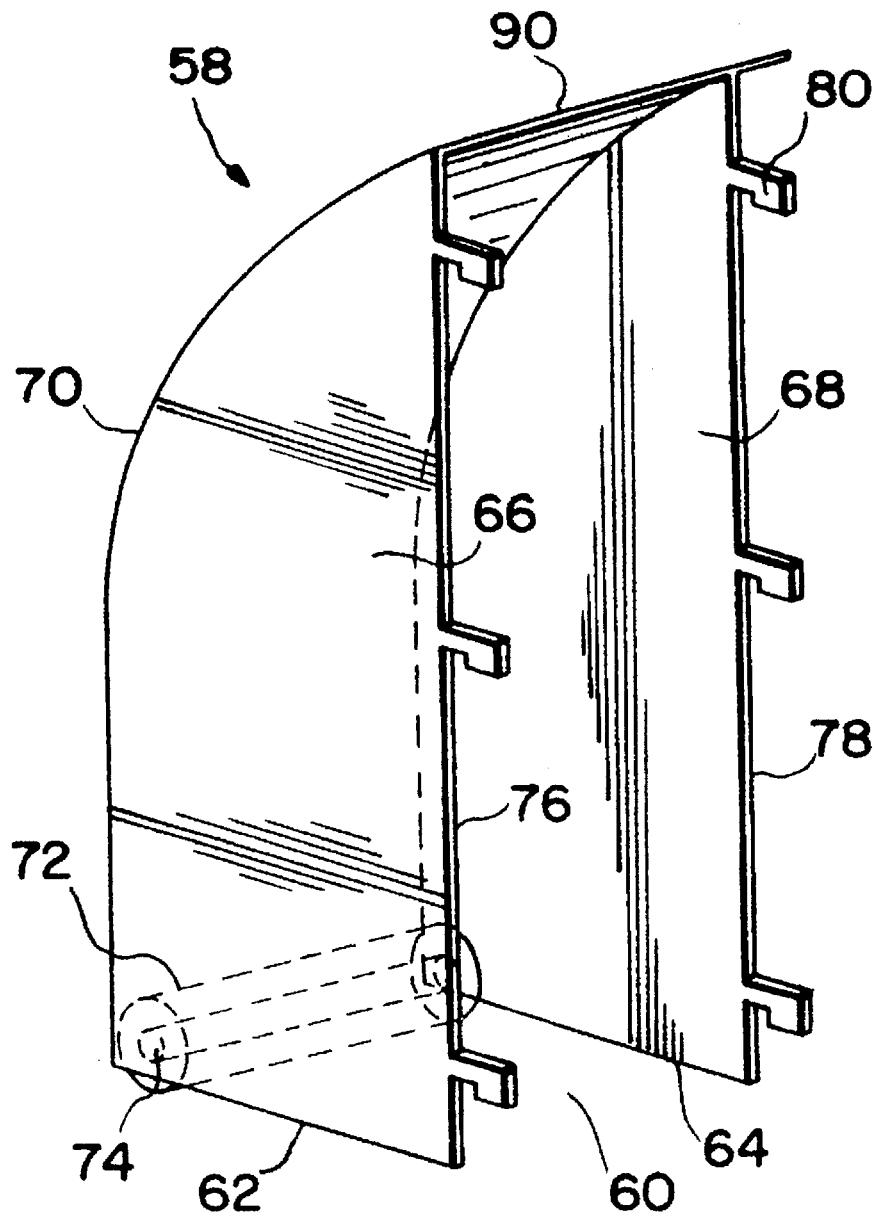

A front section (58), shown in FIG. 4, is releasibly connected to the rear section (30) of the covering or casing of the tool set; when the front and the rear sections (58) and (30) are assembled, the result is a complete covering, the open base surface of which, as defined by the edges (36) and (38) of the section (30) or the edges (62) and (64) of the section (58), respectively, form a slot (60). A segment of the tool set projects through this slot (i).

The front section (58), which is smaller than the rear section (30), also has two parallel side walls (66) and (68) that are joined to each other by a curved front wall (70). Within this curved area, which is to say in the area of the slot (60), there is also a slide element that is in the form of a guide roller (72), and this roller rotates about a shaft (74) that is parallel to the axis of the tool.

In order that the front section (58) can be releasibly connected to the rear section (30), hook-shaped projections extend from the long edges (76) and (78) of the walls (66) and (68), and these engage in slot-like receptacles (82) and (84) in the long edges (86) and (88) of the walls (32) and (34) of the rear section (30) of the covering.

In addition, a section (90) of the wall (70) can cover areas of the wall (46) of the rear section (30). An alternative or additional locking means or another type of connection between the front and the rear section (58), (30) of the covering is also possible in order to prevent any uncontrolled release.

In normal cutting operations, the tool set is covered by the sections (58) and (30), so that only one segment of the tool set projects through the slot (60). If a cutting operation is to be performed in a corner area, the front section (58) is removed, so that not only the segment that projects through the slot (60), but also the segment that projects through the face surface that is defined by the edges (86) and (88) of the rear section (30) can perform the cutting operation.

We claim:

1. A joint cutter comprising a circular tool operable by an electric motor drive (12) covered by a drive housing (10), a mounting device (22) which is detachably fixed with the drive housing and a covering means for partially surrounding the circular tool, said covering means including a rear section (30) and a front section (58), the rear section incorporating a vacuum connector, the rear section forming a slot (60) through which a first segment of the circular tool can project, said rear section having at least one attachment element within an elongated opening of the mounting device (22) for detachably connecting the rear section to the mounting device and for adjustment of the covering means with respect to said first segment to adjust a desired cutting depth, said front section covering a second segment of the circular tool which is exposed only when the front section is completely removed, whereby the first and second segments which project from the rear section are defined by chords which intersect at right angles.

2. A joint cutter as defined in claim 1 wherein the mounting (22) is formed with two sections (24, 26) disposed at an angle to each other, and said sections extend along outer surfaces of the rear section (30) of the covering means.

3. A joint cutter as defined in claim 2, wherein each of the sections (30, 58) of the covering means includes a slider element (50, 72) that is rotatable about a shaft (52, 74) that is parallel to the plane subtended by the slot (60) in the covering means.

4. A joint cutter as defined in claim 1, wherein each of the sections (30, 58) of the covering means includes a slider element (50, 72) that is rotatable about a shaft (52, 74) and the shaft is parallel to the plane subtended by the slot (60) in the covering.

5. A joint cutter as defined in claim 1, wherein the edges (86, 88) of the rear section (30) of the covering means form receptacles (82, 84) for edges (76, 78) of the front section (58) or for projections (80) that extend from these edges.

6. A joint cutter as defined in claim 5, characterized in that the projections (80) are hooks that enter into detent in the receptacles (82, 84).

* * * * *